US012748735B2

(12) United States Patent
Stelling Neto et al.

(10) Patent No.: US 12,748,735 B2
(45) Date of Patent: Sep. 29, 2026

(54) TEMPLATE DATABASE GENERATION SYSTEM

(71) Applicant: Dell Products L.P., Round Rock, TX (US)

(72) Inventors: Roberto Nery Stelling Neto, Rio de Janeiro (BR); Vítor Nascimento Lourenço, Niterói (BR); Werner Spolidoro Freund, Rio de Janeiro (BR); Sarah Evans, Parker, CO (US)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 18/423,140

(22) Filed: Jan. 25, 2024

(65) Prior Publication Data

US 2025/0245330 A1 Jul. 31, 2025

(51) Int. Cl.

| | |
|---|---|
| ***G06F 16/20*** | (2019.01) |
| ***G06F 16/21*** | (2019.01) |
| ***G06F 16/84*** | (2019.01) |
| *G06F 16/2452* | (2019.01) |
| *G06F 16/30* | (2019.01) |
| *G06F 21/57* | (2013.01) |
| *G06F 40/186* | (2020.01) |

(52) U.S. Cl.

CPC ............ *G06F 16/214* (2019.01); *G06F 16/84* (2019.01); *G06F 16/24522* (2019.01); *G06F 16/30* (2019.01); *G06F 21/57* (2013.01); *G06F 40/186* (2020.01)

(58) Field of Classification Search

CPC .. G06F 16/214; G06F 16/24522; G06F 16/30; G06F 16/84; G06F 21/57; G06F 40/186

See application file for complete search history.

(56) References Cited

U.S. PATENT DOCUMENTS 12,309,182 B1 * 5/2025 McAleer ................ G06F 9/455
2019/0279101 A1 * 9/2019 Habti .................... G06F 16/383
(Continued)

FOREIGN PATENT DOCUMENTS

CN 117312547 A * 12/2023 ........... G06F 16/345

OTHER PUBLICATIONS

English translation of CN 117312547 A. (Year: 2023).*
(Continued)

*Primary Examiner* — Diedra McQuitery
(74) *Attorney, Agent, or Firm* — Workman Nydegger

(57) ABSTRACT

Migrating computing systems to zero trust compliant architectures using templates that are constructed from multimodal unstructured sources. The unstructured input data is converted to structured data using a trained machine learning model. The structured data output by the model may be reviewed. If errors are found, a revision script can be revised or refined and the unstructured input data may be reingested. When the structured data is suitable, the structured data is parsed and stored as templates in a template database. A database of zero trust approved hardware and/or software may be generated. Migration operations may be performed using the templates in the template database and/or the information in the hardware and software database.

20 Claims, 4 Drawing Sheets

(56) References Cited

U.S. PATENT DOCUMENTS

2020/0356629 A1* 11/2020 Tan ........................ G06F 40/289
2024/0054232 A1* 2/2024 Mai ..................... G06F 11/3604

OTHER PUBLICATIONS

Kerman, et al, "Implementing a Zero Trust Architecture", vol. E, Risk and Compliance Management, NIST Special Publication 1800-35E, Dec. 2022.
Rose, et al, "Zero Trust Architecture" NIST Special Publication 800-207, Aug. 2020.
"GPT-4 Technical Report", https://arxiv.org/abs/2303.08774 Mar. 2024.
Tom's Obvious Minimal Language. https://toml.io/en/ (accessed Mar. 13, 2025).
Freter, Robert and Defense Information Systems Agency and National Security Agency Zero Trust Engineering Team, "Zero Trust Reference Architecture", https://nvlpubs.nist.gov/nistpubs/SpecialPublications/NIST.SP.800-207A.ipd.pdf, U.S. Department of Defense, Alexandria, Virginia, version 2, Jul. 2022, https://dodcio.defense.gov/Portals/0/Documents/Library/(U)ZT_RA_v2.0(U)_Sep22.pdf, 104 pages.
Chandramouli et al., "A Zero Trust Architecture Model for Access Control in Cloud-Native Applications in Multi-Location Environments, Initial Public Draft", National Institute of Standards and Technology (NIST) Special Publication 800-207A, Gaithersburg, MD, Apr. 18, 2023, https://nvlpubs.nist.gov/nistpubs/SpecialPublications/NIST.SP.800-207A.ipd.pdf, 29 pages.

* cited by examiner

TEMPLATE DATABASE GENERATION SYSTEM

FIELD OF THE INVENTION

Embodiments of the present invention generally relate to zero trust architectures and systems. More particularly, at least some embodiments of the invention relate to systems, hardware, software, computer-readable media, and methods for generating and/or using zero trust templates to migrate a computing system to a zero trust architecture.

BACKGROUND

Zero trust is a term that may mean different things to different entities. This is likely due to the fact that what qualifies as zero trust seems to be continually evolving. The general goal of a zero trust architecture or system, however, is to protect a computing system today and in the future. By way of example, zero trust is a holistic approach to security and includes protecting against attacks. Zero trust may also attempt to identify and remedy vulnerabilities or potential vulnerabilities.

Historically, security often focused on building a secure perimeter around a computing system. With today's computing systems that often rely on cloud services, security needs to change. Zero trust is an approach that recognizes the nature of changing computing architectures, which often include the use of cloud services of different kinds.

Zero trust may focus on improving authentication procedures (e.g., requiring multifactor authentication) at least because unauthorized access is often gained using valid credentials. Zero trust may also operate to control the ability of a user to explore a computing system. Zero trust may also relate to topics such as damage control, damage response, vulnerable or compromised hardware/software, and the like.

More generally, zero trust architectures attempt to ensure that actions performed in a computing system are not inherently trusted. However, there are no clear technical sets of reference architectures that can be used to determine whether a certain network implementation and its stack of vendor offerings is a valid construct of a zero trust architecture. Today, attempts to construct a zero trust architecture are performed using generic architectures and poorly defined product capabilities. The results are computing systems that vary in their compliance with zero trust principles and requirements.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
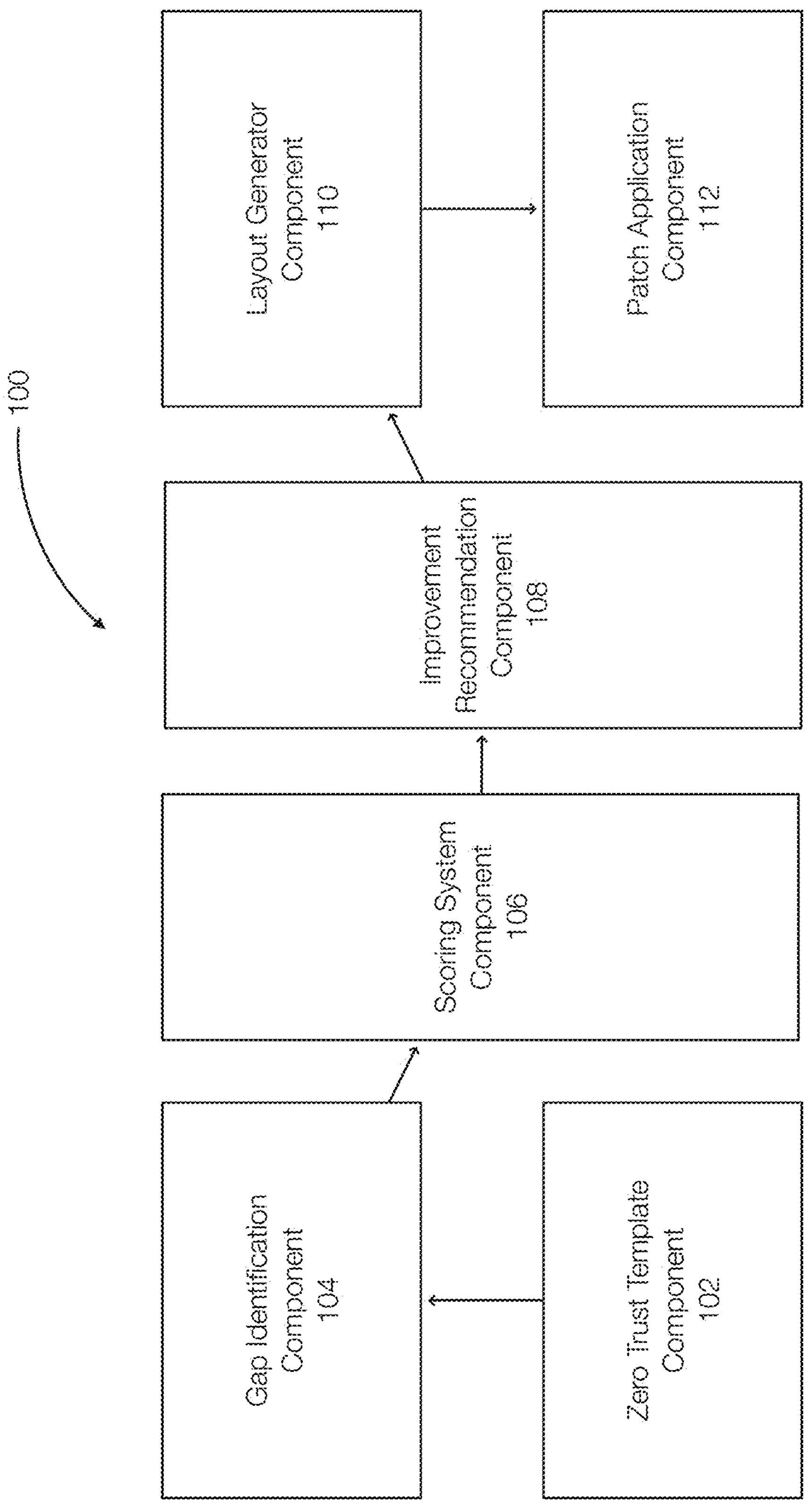
FIG. 1 discloses aspects of a system for migrating a computing system to a zero trust compliant architecture.

Embodiments of the present invention generally relate to zero trust systems and architectures. More particularly, at least some embodiments of the invention relate to systems, hardware, software, computer-readable media, and methods for zero trust templates configured for migrating computing systems to zero trust architectures. One migration is performed, the computing network becomes a zero trust computing network. A computing network, by way of example only, may refer to the arrangement and relationships of an entity's hardware and software and/or to settings of various kinds (e.g., hardware, software, user).

The adoption of zero trust principles often requires a current computing network or system to be restructured and/or reconfigured. This may include changes to device settings, network settings, user settings, hardware, software, hardware software relationships, or the like or combinations thereof. Alternatively, a computing network may be constructed from the beginning. However, most organizations or entities are unable to construct computing systems from scratch. Although embodiments of the invention are generally discussed in the context of brownfield migration (migrating from an existing network to a zero trust architecture), embodiments of the invention can be applied to greenfield migrations (supporting or creating a new computing network).

When migrating an existing computing network to a zero trust architecture, several actions are typically necessary. First, there is a need to fully discover the existing network (e.g., settings, hardware, software). As the discovery operation is performed, the need to address complicated dependencies and interactions between various zero trust architecture components and requirements becomes evident. In addition to complicating the current migration operation, it is often difficult to leverage previously performed migrations due to the fact that different organizations typically have their own uniquely organized computing networks.

The migration of a computing network to a zero trust architecture is further complicated by the fact that zero trust requirements are not static, but are evolving and changing. Analyzing or determining a gap between an existing computing network and a zero trust compliant architecture is difficult as is the process of closing these gaps.

Embodiments of the invention relate to a migration system configured to support organizations in migrating their current-state computing systems or networks (brownfield migration) to become compliant with zero trust architectures, requirements, and/or principles. Embodiments of the invention further relate to supporting or creating a new computing network (greenfield migration) that is compliant with zero trust architectures, requirements, and/or principles. Embodiments of the invention may support environment discovery, describe the dependencies and interactions between computing components, systems, and/or requirements, and/or recommend network architectures, including software and/or hardware components.

Embodiments of the invention have the ability to adapt to different starting computing network configurations, identify gaps between the existing network configurations and recommended zero trust architectures, and aid in closing these gaps. This may be performed in the context of evolving zero trust requirements.

FIG. 1 discloses aspects of migrating a computing network to a zero trust architecture as a service. A migration system 100 includes various components that may operate independently and may rely on content from or output of other components in the migration system 100. The migration system 100 includes a zero trust template component 102. The zero trust component 102 is configured to generate and store hardware and software appliances that are approved for inclusion in a zero trust architecture. The zero trust component 102 may also include or generate a collection of compliant network graph segments and attributes of the graph segments. These attributes may be used as inputs into a combination or collection of templates that meet the criteria for a zero trust compliant solution. For example, a graph segment may illustrate a connection between two servers (the servers are the nodes). The edges may represent a network connection. The attributes may describe approved hardware configurations and approved network configurations. The graph segment may illustrate authentication or the like.

The gap identification component 104 may be configured to evaluate an existing computing network. The gap identification component 104 may compare an existing description of the computing network (e.g., attributes) with templates from the zero trust template component 102. The comparison or evaluation allows gaps in the computing network to be identified. The comparison or evaluation also allows templates to be identified that can be used for migrating the computing network to a zero trust architecture.

The scoring system component 106 may be configured to generate a score that reflects the cybersecurity risks of the gap in the computing network being evaluated. The score may be for the computing network as a whole or may include scores on a more granular level (e.g., for specific hardware or software components). A mapping between the gap and a score (or a recommended score) may be generated.

The map allows the improvement recommendation component 108 to generate or recommend changes or improvements to migrate the client computing network towards a zero trust compliant architecture. The improvements may be prioritized based on the scores generated by the scoring system component 106. The improvement recommendation 108 may generate a recommendation that also accounts for specific requirements of the organization.

The layout generator component 110 may receive the output of the improvement recommendation component 108 and generate a recommended layout, which may include software and/or hardware recommendations, configurations, connection. In one example, the layout generator component 110 may benefit from the assistance of a human in the loop to provide assistance or hints. Once the layout is approved, the approved layout may be applied in the client computing network by the patch application component 112. The patch application component 112 may be configured, for example, to implement or orchestrate software changes, setting changes, or the like. Hardware, if necessary, may be installed and configured.

The migration system 100 may be applied to both greenfield and brownfield migrations. Further, the migration system 100 may be applied in an ongoing manner. As previously stated, baseline zero trust requirements are evolving and embodiments of the system allow computing systems to be migrated to zero trust compliant architectures and then patched as necessary in order to adapt to, by way of example, changes in zero trust requirements.

Embodiments of the invention relate to zero trust architecture templates, which may be represented in the form of graphs, that can be used to determine whether a specific computing network, with its associated stack of vendor offerings, is a valid construct in or of a zero trust architecture. Given the evolving status of zero trust and its definitions, the ability to become zero trust compliant may be a moving target. Thus, migrating to a zero trust compliant architecture may require a computing network to be patched or updated to maintain a zero trust compliant status.

Embodiments of the invention relate to facilitating the construction of templates that are approved for zero trust architectures and to performing migration operations. In addition to zero trust templates, embodiments of the invention may also include a list or database of zero trust compliant hardware and software that can be used to evaluate brownfield and greenfield constructs and perform migration operations.

Figure 2:
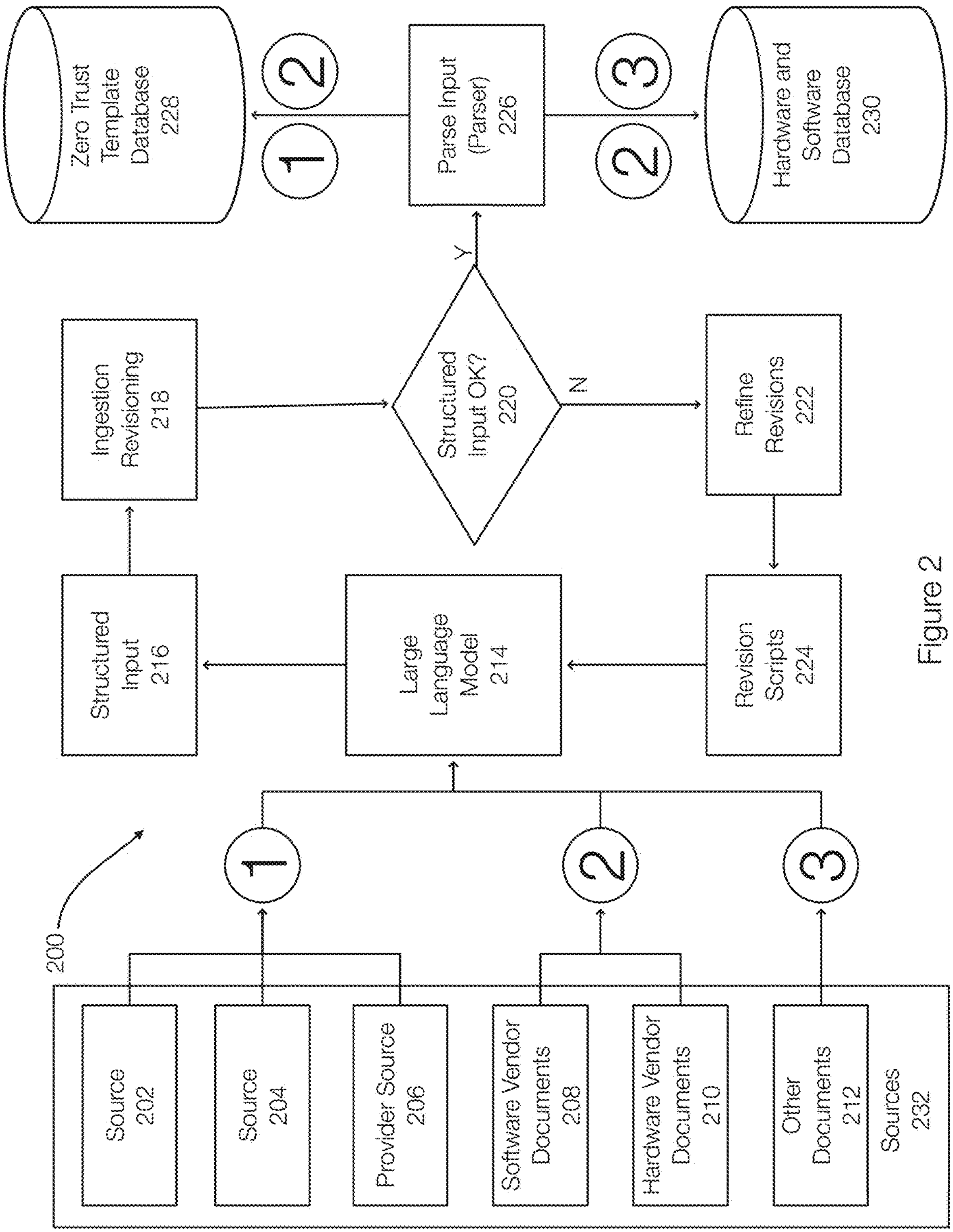
FIG. 2 discloses aspects of generating templates of zero trust compliant solutions or architectures.

FIG. 2 discloses aspects of a method for generating or constructing zero trust templates and identifying zero trust compliant hardware and/or software. In one example, FIG. 2 illustrates aspects of the zero trust template component 102 in FIG. 1. More specifically, the method 200 is configured to generate a hardware and software database 230 that identifies software and hardware that can be part of or that are approved for a zero trust architecture. The method 200 may also generate a zero trust template database 228 that stores zero trust templates, for example in graph form. The templates may include zero trust network graph segments and their attributes. A computing network can be constructed or upgraded to a zero trust architecture using the zero trust template database 228 and/or the hardware and software database 230.

The method 200 is configured to generate or obtain abstracted complex relationships from unstructured multimodal documents to facilitate the process of building the templates stored in the zero trust template database 228. The method 200 may also include reusable revision scripts that can be applied to new or previously unseen document to accelerate the information extraction process. For example, and as discussed in more detail below, the model may have difficulty extracting structured data from a particular file type or other unstructured data source, the revision scripts 224 improve the ability of the model 214 to extract data from the unstructured data. In one example, each file type may be associated with a corresponding revision script. In one example, the revision scripts 224 may relate to corrections or adjustments to be made to prompts, examples, context, and instructions to the model 214, not necessarily changes to the model 214 itself. However, changes to the model 214 are not excluded.

The method 200 may start by collecting or receiving, as input, unstructured data from various sources. The sources 232 may include definitions, characteristics, definitions, or the like of zero trust architectures/systems/requirements/definitions. The sources 232 generally represent unstructured sources of zero trust information, such as documents.

For example, the source 202 may be Department of Defense Zero Trust Reference Architecture found at https://doi.org/10.6028/NIST.SP/800-207A, which is incorporated by reference in its entirety.

The source 204 may represent additional aspects of zero trust architectures that may be provided by a government or regulatory source. An example is found at https://www.nccoe.nist.gov/projects/impomenenting-zero-trust-architecture, which is incorporated by reference in its entirety. The provider source 206 may represents additional aspects of zero trust architectures, requirements, definitions that may be received from of a provider (e.g., a migration as a service provider) or other source. The provider source 206 may provide the ability to bridge a descriptive gap between zero trust requirements and zero trust definitions. Further, the provider source 206 may allow a zero architecture to be uniquely configured and provisioned.

More specifically, the sources 202, 204, and 206 may represent zero trust related data from, by way of example only, regulatory organizations, industry groups, and/or specific providers.

The method 200 is not limited to the sources 202, 204, and 206 and may include other data sources. Generally, the sources 202, 204, and 206 include unstructured text that may be represented in different manners, which may include image form and text form. In other words, the data may be multi-modal in nature.

The sources 232 may also include vendor documents, such as software vendor documents 208 and hardware vendor documents 210. These documents 208 and 210 may represent at least marketing and technical information or data of various software and hardware offerings, which may include text, images, or the like. The components represented in the documents 208 and 210 represent the building blocks for the zero trust templates 228.

Additional documents 212 or other sources of information relevant to zero trust architecture may also be acquired. The documents 212, which may also be unstructured and include images and text, may enrich the descriptions provided in the documents 210 and 212. For example, the documents 212 may provide versioning capabilities, properties required by zero trust, or other complementary information that may be missing from other original source documents.

These types of sources are labels 1, 2, and 3 in FIG. 2. Information from sources 1 and 2 are ultimately incorporated into the database 228 and information from the sources 2 and 3 may be incorporated into the database 230. This is by way of example and not limitation.

The data collected from or included in the sources 232, as previously stated, are typically unstructured data and may be represented as or include images, text, or the like or combination thereof. Advantageously, embodiments of the invention can adapt to changes in zero trust requirements automatically and removes the need for security practitioners to read, research, and memorize aspects of regulatory controls and vendor offerings.

The sources 232 are input into a large language multimodal model 214 (dubbed FTMM LLM herein), which is fine-tuned for the task and context of embodiments of the invention using similar training data. The process allows the multimodal model 214 to handle descriptions of valid zero trust scenarios that may be presented using text and/or graphics. Embodiments of the invention are also configured to summarize the content of the sources 232 in a desired format.

Figure 3:
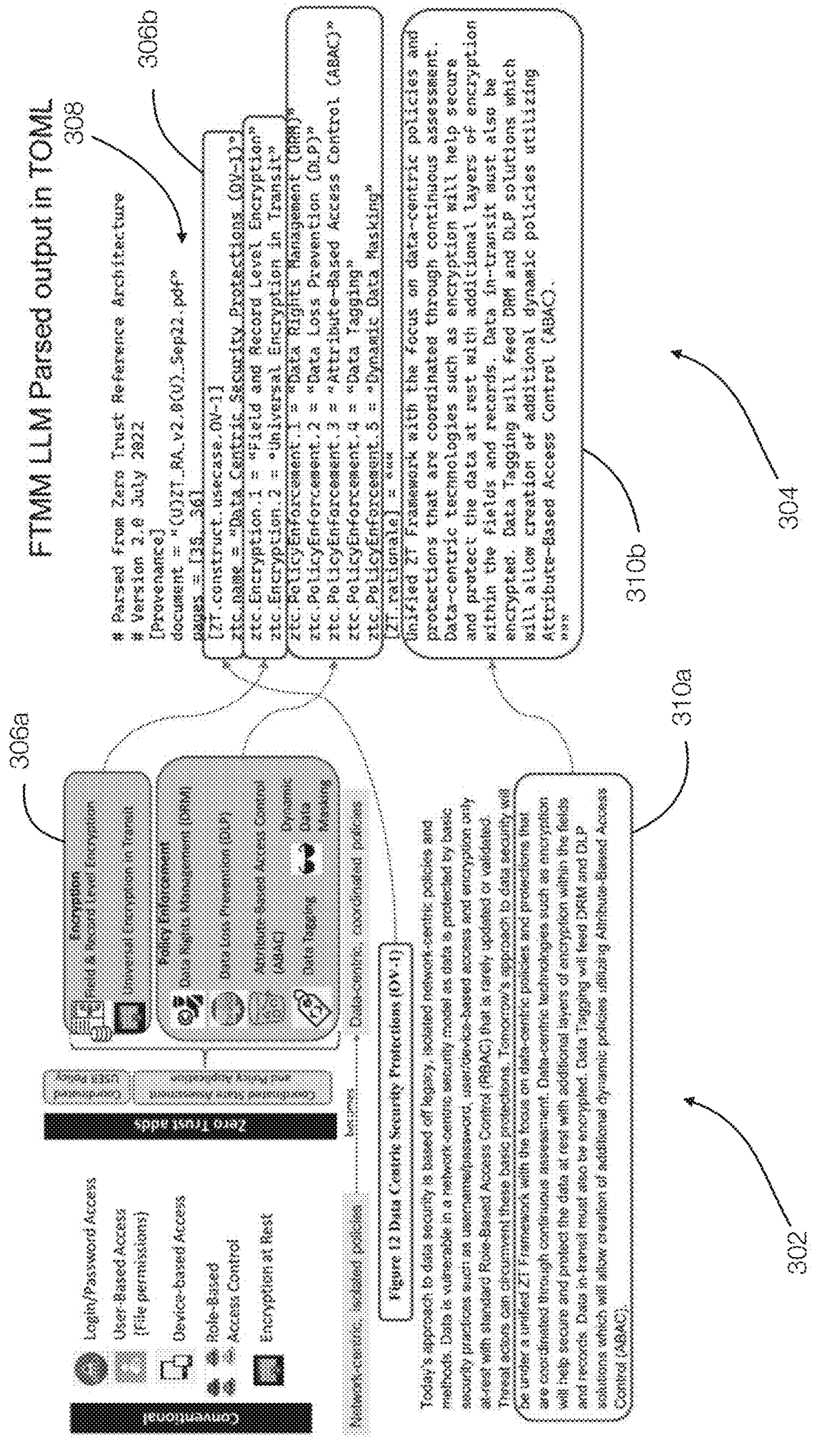
FIG. 3 discloses aspects of converting unstructured multimodal data to structured data.

FIG. 3 discloses aspects of structured input data that is generated by a model such as the model 214. More specifically, with reference to FIGS. 2 and 3, the model 214 receives data from the sources 232 and generates structured input 216.

More specifically, FIG. 3 illustrates an example of unstructured data 302 that may be representative of data from the sources 232. More specifically, the unstructured data 302 is from the Department of Defense Zero Trust Reference Architecture previously mentioned. The structured data 304 is an example of structured data 212.

As illustrated in FIG. 3, the model 214 may extract data from the unstructured input data 302 to generate the structured input data 304, which is an example of the structured data 216. For example, the structured data 304 may identify a document source/page number 308 (e.g., provenance information). The unstructured input data **306*a*, which is an image in this example, is converted to structured output data 306*b*. Unstructured input text data 310*a* is converted to structured output data 310*b***. By way of example only, the structured data is represented in Tom's Obvious Minimal Language (TOML) (https://toml.io/en/), which is an example of a structure.

Returning to FIG. 2, the structured input 216 may be subject to ingestion revisioning 218. In one example, ingestion revisioning 218 may include using a lint parser (and/or a human in the loop) and/or other tools to evaluate the structured input 216 generated by the model 214. A lint parser may be able to identify aspects of the structured input 216 that may be incorrect or unsuitable. For example, improper constructs, formatting, errors, or other inconsistencies may be identified by the ingestion revisioning 218.

The method 200 then determines whether the structured input is OK (e.g., errors below a threshold or no errors). If the structure input is not OK or not suitable (N at 220), the revisions may be refined 222. More specifically, embodiments of the invention include revision scripts 224 that may each be tailored to a specific input file type or other aspect of the unstructured input. A revision script 224 is an instruction (or instructions) that has been crafted to improve the performance of the model 214 and reduce errors in the structured input 216. The revision script 224 can improve the manner in which data is extracted from the unstructured input data by the model 214. The revision script 224 is applied whenever corresponding unstructured input data (e.g., based on file type) is input to the model 214.

In this example, when the structured input 216 does not meet requirements or is insufficient (N at 220) the corresponding revision script 224 may be revised 222 based, in part, on the ingestion revisioning 218 operation. Thus, if an error or inconsistency is discovered during ingestion revisioning 218, the corresponding revision script 224 may be refined 222.

In one example when the structured input is not OK (N at 220), the corresponding revision script 224 is refined 222, at least part of the unstructured data is re-ingested or input to the model 214 to produce or regenerate the structured input 216 or portion thereof. The process of refining revisions 222 may be triggered by a user responsible for ingested revision 218 or automatically based, for example, on an output of a lint parser.

For example, a fine-tuning process can be triggered when a lint analyzer or parser detects an error in the structured input 216. A user can revise the error, identify the input document (FIG. 3 illustrates that each input document has a provenance field), and suggest improvements in the corresponding revision script 224. Revising the revision script 224 may be sufficient to correct the error. For more complex errors, the model 214 may need to be retrained.

Once the structured input 216 is approved (Y at 220), the structured input 216 is parsed 226. Parsing the structured input 216 may include aggregating and combining files created by the model 214 and converting the combined input for storage in one or more of the databases 228 and 230.

In one example, the hardware and software database 230 may include or identify hardware and software appliances that can be included in or that are approved for a zero trust architecture. The template database 228 may include a collection of zero trust compliant network graph segments and their attributes. These graph segments and attributes may be used as future inputs into a combination of template solutions to implement zero trust architectures that are compliant to zero trust specifications.

In one example, a zero trust scoring system may combine the databases 228 and 230 to generate collections of zero trust motifs with hardware and software instantiations and a score for each motif. The score of the motif may be a function of the scores of all components. These scores may be weighted in some examples.

Thus, embodiments of the invention obtain abstracted and complex relationships from multi-modal documents or sources to build a template database amenable to zero trust constructs. Embodiments of the invention also relate to revision scripts that can be applied to new or previously unseen documents in order to accelerate the process of extracting information from these new or previously unseen sources of zero trust data.

As apparent from this disclosure, an embodiment of the invention may possess various useful features and aspects, although no embodiment is required to possess any of such features or aspects. Embodiments of the invention may include or relate to migration operations, template operations, template creation operations, zero trust architecture related operations, migrating brownfield or greenfield systems to zero trust architectures, or the like or combinations thereof. Embodiments of the invention may relate to any operations related to migrating/replicating data in an energy aware manner.

Following are some further example embodiments of the invention. These are presented only by way of example and are not intended to limit the scope of the invention in any way.

Embodiment 1. A method comprising: receiving unstructured input data into a model configured to generate structured input data from the unstructured input data, determining whether the structured input data output by the model is acceptable, parsing the structured input data to generate templates that define zero trust architectures and storing the templates in a first database when the structured input data is acceptable, and parsing the structured input data to identify hardware and software that are approved for the zero trust architectures and storing the identified hardware and software in a second database.

Embodiment 2. The method of embodiment 1, further comprising migrating a computing system to a zero trust architecture based on a template stored in the first database.

Embodiment 3. The method of embodiment 1 and/or 2, further comprising migrating the computing system to the zero trust architecture using software and/or hardware specified in the second database.

Embodiment 4. The method of embodiment 1, 2, and/or 3, further performing ingestion revisioning on the structured input data using at least a lint parser, wherein an output of the lint parser is configured to be reviewable by a user, wherein the structured input data is acceptable when errors are less than a threshold level.

Embodiment 5. The method of embodiment 1, 2, 3, and/or 4, further comprising revising a revision script based on revisions identified when performing ingestion revisioning on the structured input data, wherein revisions are made to the revision script when the structured input data is not acceptable.

Embodiment 6. The method of embodiment 1, 2, 3, 4, and/or 5, further comprising re-ingesting at least a portion of the unstructured input data using the revision script, wherein a process of revising the revision script and at least a portion of the unstructured input data is re-ingested by the model until the structed input data is acceptable or for a predetermined number of iterations.

Embodiment 7. The method of embodiment 1, 2, 3, 4, 5, and/or 6, further comprising applying a plurality of revision scripts when ingesting the unstructured input data, wherein each of the revision scripts is associated with a file type.

Embodiment 8. The method of embodiment 1, 2, 3, 4, 5, 6, and/or 7, wherein the revision scripts improve extracting data from new or unseen unstructured input data.

Embodiment 9. The method of embodiment 1, 2, 3, 4, 5, 6, 7, and/or 8, wherein the unstructured input data comprises unstructured multimodal data including text and images, wherein sources of the unstructured input data include regulatory sources, provider sources, vendor sources, and complementary sources, wherein the complementary sources complement at least vendor sources or provide complementary information missing from the other sources.

Embodiment 10. The method of embodiment 1, 2, 3, 4, 5, 6, 7, 8, and/or 9, wherein the templates comprise graphs that define zero trust constructs.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-15.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term client, module, component, engine, agent, service, or the like may refer to software objects or routines that execute on the computing system or may also refer to hardware depending on context. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments, which may be remote or on-prem, where one or more of a client, server, or other machine may reside and operate in a cloud environment.

Figure 4:
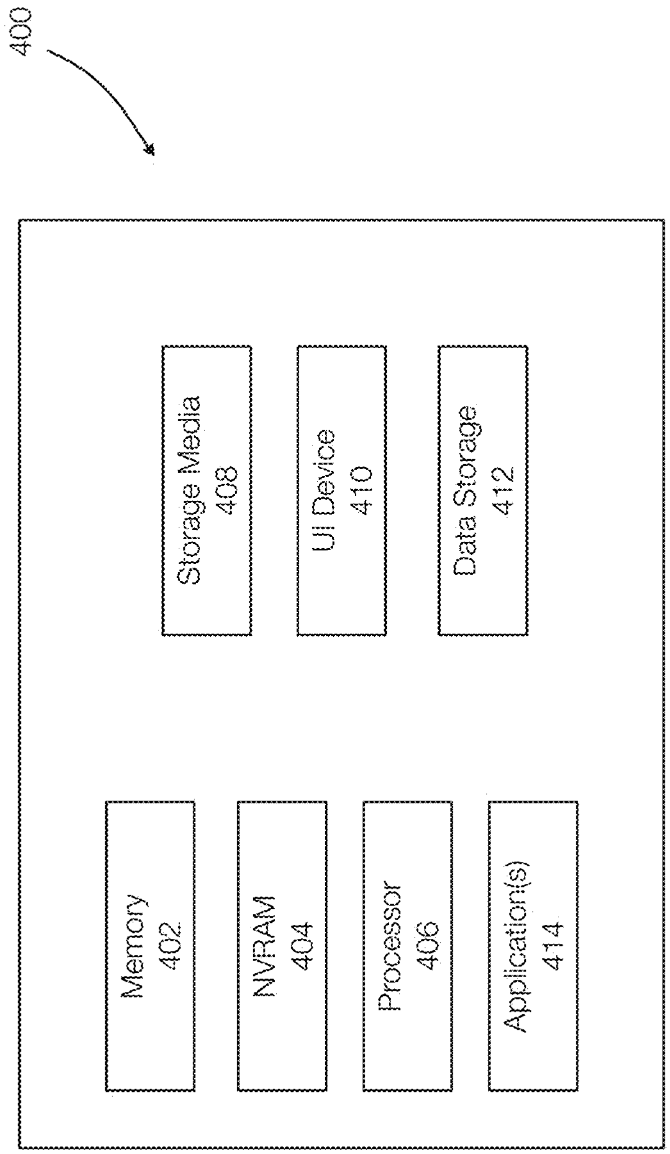
FIG. 4 discloses aspects of a computing device, system, or entity.

With reference briefly now to FIG. 4, any one or more of the entities disclosed, or implied, the Figures and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 400 may also be representative of servers, clusters of servers, nodes, or the like. The computing resources represented by the device 400 may represent the computing resources of a cloud provider that can be allocated or used for energy aware compression operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving unstructured multimodal input data including text and images into a model configured to generate structured input data from the unstructured input data;

determining, using ingestion revisioning comprising at least a lint parser, whether the structured input data output by the model is acceptable, wherein the structured input data is acceptable when errors are less than a threshold level;

when the structured input data is not acceptable, revising a revision script and re-ingesting at least a portion of the unstructured input data using the revision script until the structured input data is acceptable or for a predetermined number of iterations;

parsing the structured input data to generate templates that define zero trust architectures and storing the templates in a first database when the structured input data is acceptable; and parsing the structured input data to identify hardware and software that are approved for the zero trust architectures and storing the identified hardware and software in a second database.

2. The method of claim 1, further comprising migrating a computing system to a zero trust architecture based on a template stored in the first database.

3. The method of claim 2, further comprising migrating the computing system to the zero trust architecture using software and/or hardware specified in the second database.

4. The method of claim 1, further comprising performing ingestion revisioning on the structured input data using at least a lint parser, wherein an output of the lint parser is configured to be reviewable by a user, wherein the structured input data is acceptable when errors are less than a threshold level.

5. The method of claim 1, further comprising revising a revision script based on revisions identified when performing ingestion revisioning on the structured input data, wherein revisions are made to the revision script when the structured input data is not acceptable.

6. The method of claim 5, further comprising re-ingesting at least a portion of the unstructured input data using the revision script, wherein a process of revising the revision script and at least a portion of the unstructured input data is re-ingested by the model until the structured input data is acceptable or for a predetermined number of iterations.

7. The method of claim 1, further comprising applying a plurality of revision scripts when ingesting the unstructured input data, wherein each of the revision scripts is associated with a file type.

8. The method of claim 7, wherein the revision scripts improve extracting data from new or unseen unstructured input data.

9. The method of claim 1, wherein the unstructured input data comprises unstructured multimodal data including text and images, wherein sources of the unstructured input data include regulatory sources, provider sources, vendor sources, and complementary sources, wherein the complementary sources complement at least vendor sources or provide complementary information missing from the other sources.

10. The method of claim 1, wherein the templates comprise graphs that define zero trust constructs.

11. A non-transitory storage medium having stored therein instructions that are executable by one or more hardware processors to perform operations comprising:

receiving unstructured multimodal input data including text and images into a model configured to generate structured input data from the unstructured input data;

determining, using ingestion revisioning comprising at least a lint parser, whether the structured input data output by the model is acceptable, wherein the structured input data is acceptable when errors are less than a threshold level;

when the structured input data is not acceptable, revising a revision script and re-ingesting at least a portion of the unstructured input data using the revision script until the structured input data is acceptable or for a predetermined number of iterations;

parsing the structured input data to generate templates that define zero trust architectures and storing the templates in a first database when the structured input data is acceptable; and parsing the structured input data to identify hardware and software that are approved for the zero trust architectures and storing the identified hardware and software in a second database.

12. The non-transitory storage medium of claim 11, further comprising migrating a computing system to a zero trust architecture based on a template stored in the first database.

13. The non-transitory storage medium of claim 12, further comprising migrating the computing system to the zero trust architecture using software and/or hardware specified in the second database.

14. The non-transitory storage medium of claim 11, further comprising performing ingestion revisioning on the structured input data using at least a lint parser, wherein an output of the lint parser is configured to be reviewable by a user, wherein the structured input data is acceptable when errors are less than a threshold level.

15. The non-transitory storage medium of claim 11, further comprising revising a revision script based on revisions identified when performing ingestion revisioning on the structured input data, wherein revisions are made to the revision script when the structured input data is not acceptable.

16. The non-transitory storage medium of claim 15, comprising re-ingesting at least a portion of the unstructured input data using the revision script, wherein a process of revising the revision script and at least a portion of the unstructured input data is re-ingested by the model until the structured input data is acceptable or for a predetermined number of iterations.

17. The non-transitory storage medium of claim 11, further comprising applying a plurality of revision scripts when ingesting the unstructured input data, wherein each of the revision scripts is associated with a file type.

18. The non-transitory storage medium of claim 17, wherein the revision scripts improve extracting data from new or unseen unstructured input data.

19. The non-transitory storage medium of claim 11, wherein the unstructured input data comprises unstructured multimodal data including text and images, wherein sources of the unstructured input data include regulatory sources, provider sources, vendor sources, and complementary sources, wherein the complementary sources complement at least vendor sources or provide complementary information missing from the other sources.

20. The non-transitory storage medium of claim 11, wherein the templates comprise graphs that define zero trust constructs.

* * * * *